(12) United States Patent  
Burke

(10) Patent No.: US 6,200,267 B1
(45) Date of Patent: Mar. 13, 2001

(54) HIGH-SPEED ULTRASOUND IMAGE IMPROVEMENT USING AN OPTICAL CORRELATOR

(76) Inventor: Thomas Burke, 1507 175th Pl. SE., Bothell, WA (US) 98102

( * ) Notice: Subject to any disclaimer, the term of this patent is extended or adjusted under 35 U.S.C. 154(b) by 0 days.

(21) Appl. No.: 09/078,193

(22) Filed: May 13, 1998

(51) Int. Cl.[7] ....................................................... A61B 8/00
(52) U.S. Cl. .................................................................. 600/443
(58) Field of Search ............................... 600/443, 447, 600/455–456; 382/124, 181, 190; 356/381, 459

(56) References Cited

U.S. PATENT DOCUMENTS

| | | | |
|---|---|---|---|
| 4,039,815 | * 8/1977 | Geluk | 708/816 |
| 4,289,140 | 9/1981 | Carpenter et al. | 128/660 |
| 4,817,614 | 4/1989 | Hassler et al. | 128/660.05 |
| 4,832,447 | 5/1989 | Javidi | 350/162.13 |
| 4,835,689 | 5/1989 | O'Donnell | 364/413.25 |
| 4,852,577 | 8/1989 | Smith et al. | 128/660.07 |
| 4,989,143 | 1/1991 | O'Donnell et al. | 364/413.25 |
| 5,029,220 | 7/1991 | Juday | 382/6 |
| 5,090,412 | * 2/1992 | Shimazaki | 600/443 |
| 5,216,541 | 6/1993 | Takesue et al. | 359/561 |
| 5,311,359 | 5/1994 | Lucas et al. | 359/561 |
| 5,327,892 | 7/1994 | Nakamura et al. | 128/660.07 |
| 5,331,964 | 7/1994 | Trahey et al. | 128/661.01 |
| 5,388,461 | * 2/1995 | Rigby | 600/442 |
| 5,438,632 | 8/1995 | Horner | 382/278 |
| 5,471,989 | 12/1995 | Roundhill et al. | 128/660.04 |
| 5,482,045 | 1/1996 | Rust et al. | 128/661.01 |
| 5,538,004 | * 7/1996 | Bamber | 600/443 |
| 5,650,855 | 7/1997 | Kirsch et al. | 356/394 |

OTHER PUBLICATIONS

"Hybrid Optical/Digital Processor Recognition Systems, Real–Time Pattern Recognition System Hardware and Simulation," Litton Data Systems, 1997.

"Real–Time Pattern Recognition Using a Hybrid Optical/ Digital Processor," White Paper, Litton Data Systems, Apr. 1997, pp. 1–6.

* cited by examiner

Primary Examiner—Francis J. Jaworski
(74) Attorney, Agent, or Firm—Fish & Neave; Nicola A. Pisano

(57) ABSTRACT

A medical ultrasound imaging system is disclosed that uses an optical correlator to provide improved ultrasound image quality. In a first embodiment, the optical correlator is used to compute an optimization metric based on speckle size and shape. This metric is used to compare images generated using different values for several parameters, including receive delays, transmit delays, filter settings, and transmit waveforms, and to automatically select settings for these parameters for the tissue being examined. Other embodiments use the optical correlator to identify and highlight features in ultrasound images, and to reduce distortion and noise in ultrasound images using a "synthetic aperture" beamformer technique.

30 Claims, 4 Drawing Sheets

HIGH-SPEED ULTRASOUND IMAGE IMPROVEMENT USING AN OPTICAL CORRELATOR

FIELD OF THE INVENTION

The present invention relates to apparatus and methods for improving an image produced by a medical ultrasound system. More specifically, the present invention uses an optical correlator to provide an optimization metric which is used to improve the image by adjusting the imaging parameters of the ultrasound system, or by processing the image data using the metric produced by the optical correlator.

BACKGROUND OF THE INVENTION

Ultrasound imaging is widely used for diagnosis in numerous medical fields. When properly used and adjusted, an ultrasound imaging system can non-invasively provide a cross-sectional view within soft tissue being imaged, such as tissue of a breast, brain, heart, kidney, liver, lung, eye, abdomen, or pregnant uterus.

A typical ultrasound imaging device operates by directing short ultrasonic pulses, typically having a frequency in the range of 1–30 MHZ, into the tissue being examined. The device then detects echoes of the ultrasonic pulses caused by acoustic impedance discontinuities or reflecting surfaces within the tissue.

A typical scanhead for an ultrasound imaging system has a linear array of ultrasonic transducers, which transmit ultrasonic pulses, and detect returning echoes. The array of transducers provides simultaneous views of the tissue at positions roughly corresponding to the positions of the transducers. The delay time between transmitting a pulse and receiving an echo is indicative of the depth of the discontinuity or surface which caused the echo. The magnitude of the echo is plotted against the position and depth (or time) information to produce a cross-sectional view of the tissue in a plane perpendicular to the face of the scanhead.

There are many sources of distortion which may effect the quality of an ultrasound image. For example, the velocity of the ultrasonic pulses through tissue vary according to the tissue type. The propagation velocity of ultrasound ranges from approximately 1470 m/s in fat tissue, to more than 1600 m/s in muscle tissue, and as much as 3700 m/s in bone. Since the timing of an echo pulse is used to estimate the depth of a tissue feature, this variation in velocity of the pulse can lead to distortions along the depth axis of the image. This source of distortion is especially severe in tissue which is highly inhomogeneous, such as breast tissue.

Inhomogeneous tissues can also cause other distortions in the image produced by an ultrasound system, due to refraction effects. Additional sources of distortion may include scattering of the ultrasonic pulses, and interference between pulses from different transducers.

The distortions and noise present in an ultrasound image may be reduced by adjusting a number of parameters associated with the transmission of the pulses, the reception of the echoes, and the processing of the received echo data. For example, it is possible to apply differing time delays to the echo signals received from each of the transducers, to attempt to better "focus" the image produced.

There are a large number of parameters which must be adjusted to produce a good image from an ultrasound imaging system. These parameters may include the number of transducers which will be used for transmitting ultrasonic signals into the tissue, the wave shape to be transmitted by each transmitting transducer, the amplitude of the wave to be transmitted by each transmitting transducer, the transmit time delay to be used by each transmitting transducer, the number of transducers that will receive echoes, the gain of each receiving transducer, the receive time delay of each receiving transducer, and the filters to be applied to the incoming echo signals. There are complex relationships between these parameters, so that they cannot be optimized independently. Furthermore, the optimal parameter settings depend on the tissue being imaged, and vary with the individual patient and tissue type being examined.

In the past, these parameters have typically been adjusted by human operators, or have been selected from parameter sets which have been clinically determined to be acceptable for specific tissue types for a majority of patients. The obvious disadvantage of using a human operator is the time and skill required to make the adjustments. A disadvantage of using parameters which are selected from a file of known "acceptable" parameters is that the parameters are likely to produce better images in some patients than others.

Systems have been developed which attempt to automatically adjust various ultrasound imaging parameters to remove distortions and improve image quality. Such systems must provide a means of measuring the distortions, or of determining the image quality, so that the distortions may be corrected, or the image quality improved. Making these determinations may be computationally expensive, making it difficult for a system to correct the images in real-time. The speed at which such computationally expensive operations are carried out can be improved by using extremely high speed processors, parallel processing, or specialized hardware to perform the computations, all of which may greatly increase the cost of an ultrasound system.

The automatic ultrasound focussing systems described in U.S. Pat. Nos. 4,989,143 and 4,835,689, to O'Donnell, and U.S. Pat. No. 4,817,614, to Hassler attempt to use cross-correlation of the echo signals received by two or more of the transducers to derive information about the phase distortion of the image. That information is then used to adjust the delays associated with the transducers to improve the image. The cross correlation operations used by these methods are costly to compute and require high-performance equipment to achieve real-time performance.

An alternative approach, discussed in U.S. Pat. No. 4,852,577, to Smith et al., and U.S. Pat. No. 5,331,964, to Trahey et al., both of which are incorporated herein by reference, uses image processing techniques to derive an optimization metric for the image. The time delay parameters for each transducer are then altered, and the optimization metric is used to compare the quality of an image generated using the new parameters with the quality of an image generated using the old parameters. If the quality is improved, the system will continue adjusting the time delays in the same direction until a maximum image quality is obtained. Otherwise, the system will start adjusting the time delays in the opposite direction, and continue its adjustments until a maximum image quality is obtained. This maximizing process must be repeated for each of the transducers which are being adjusted.

The techniques described by Smith et al. and Trahey et al. require a considerable amount of computation. For each of the transducers being adjusted, it is necessary to apply the optimization metric numerous times to find the delay parameters which maximize the image quality. Each application of the optimization metric requires computation for each pixel in the image. If each image has N×M pixels, the maximizing procedure takes an average of K steps, and there are L transducers to adjust, the average number of computation steps required to optimize the image quality will be proportional to K×L×M×N. Even for small values of K, L, M, and N, this product can be very large.

Both Smith et al. and Trahey et al. attempt to keep the amount of computation under control by limiting the number of transducers which are adjusted, limiting the possible range of adjustments, and limiting the area of the image which is examined for the optimization metric to a small region of interest (ROI). For example, Smith et al. suggests using only a few transducers, and examining only five lines out of the ROI to compute the optimization metric. Smith et al. and Trahey et al. also attempt to keep the amount of computation to a minimum by choosing image brightness of the ROI, which is very easy to compute, as the optimization metric, and by using specialized hardware to compute the image brightness.

Using image brightness as an optimization metric, as suggested in Smith et al. and Trahey et al. is based on the idea that much of the texture of a medical ultrasound image consists of random speckle, resulting from interference between the echoes from a large number of fine scatterers within the tissue. Though the brightness of an individual speckle element is random, the mean brightness of the speckle is predictable, and can be used as an optimization metric. Since the mean brightness within a region of the image will be affected by the mean brightness of the speckle in that region, the brightness of a region of the image may be used as an indicator of the average brightness of the speckle within the region.

Ultimately, any method which maximizes an optimization metric will only improve an image to the extent that the metric is actually related to image quality. An extremely simple optimization metric, such as image brightness, may not be so closely related to the actual quality of the image to provide significant enhancement of the image. This difficulty may be accentuated when only a small portion of the image, such as a small ROI, is being examined.

Other optimization metrics also may be used, perhaps providing improved results at the cost of greatly increased computational demands. Smith et al., for example, suggests that speckle size (i.e. full width half maximum of the speckle texture size) may be used as an optimization metric, but this would require much more computation than a simple metric such as the brightness of a ROI. Smith et al. suggests that by using a fast digital signal processor to perform the Fourier transform needed to compute this metric, it may be possible to use speckle size as an optimization metric without causing extreme computation delays. Use of pattern matching techniques to pick out known key features in an image may also be used as an optimization metric, but is computationally expensive.

In view of the above, it would be desirable to provide an ultrasound imaging system that automatically adjusts a variety of imaging parameters in real-time or near real-time to optimize image quality.

It would also be desirable to provide a method for rapidly computing a complex optimization metric to automatically enhance the image produced by an ultrasound imaging system.

SUMMARY OF THE INVENTION

It is an object of the present invention to provide an ultrasound imaging system that automatically adjusts its imaging parameters to optimize the quality of the image produced in real-time or near real-time.

It is a further object of the present invention to provide a method for rapidly computing complex optimization metrics to automatically enhance the images produced by an ultrasound imaging system.

These and other goals of the present invention are achieved by using an optical correlator to provide an optimization metric in a medical ultrasound imaging system. An optical correlator is a device that combines optical and electronic technologies to provide nearly instantaneous pattern matching.

A preferred embodiment of the present invention uses an optical correlator to find occurrences of speckle of varying sizes in an image. Images having a high occurrence of small, well formed speckle are considered better than images having large, poorly formed speckle.

This optimization metric, which can be computed extremely rapidly using an optical correlator, is used to compare images generated before and after the adjustment of an imaging parameter, to decide whether or not the adjustment has improved the image. The system is programmed to sequence through a plurality of permutations of the imaging parameters, keeping those which improve the image, until a set of imaging parameters which produces an optimal image is found.

An alternative embodiment enhances the image by using the optical correlator to identify features of the image, so that the identified features can be highlighted.

In another alternative embodiment, numerous images are generated as an ultrasound scanhead is swept across a region, and data from these images is used to provide a "synthetic aperture" beamformer. The optical correlator is used to correlate color-encoded wavefront images generated from echo signals generated during the sweep of the scanhead with patterns of curved lines associated with known time delays. The correlation data is used to determine the time delays that should be applied to the image data so that the data may be combined to provide high image resolution over a region, and to correct for distortions and noise in the image.

BRIEF DESCRIPTION OF THE DRAWINGS

The above and other objects and advantages of the present invention will be apparent upon consideration of the following detailed description generated in conjunction with the accompanying drawings in which like reference characters refer to like parts throughout, and in which.

DETAILED DESCRIPTION OF THE INVENTION

Figure 1:
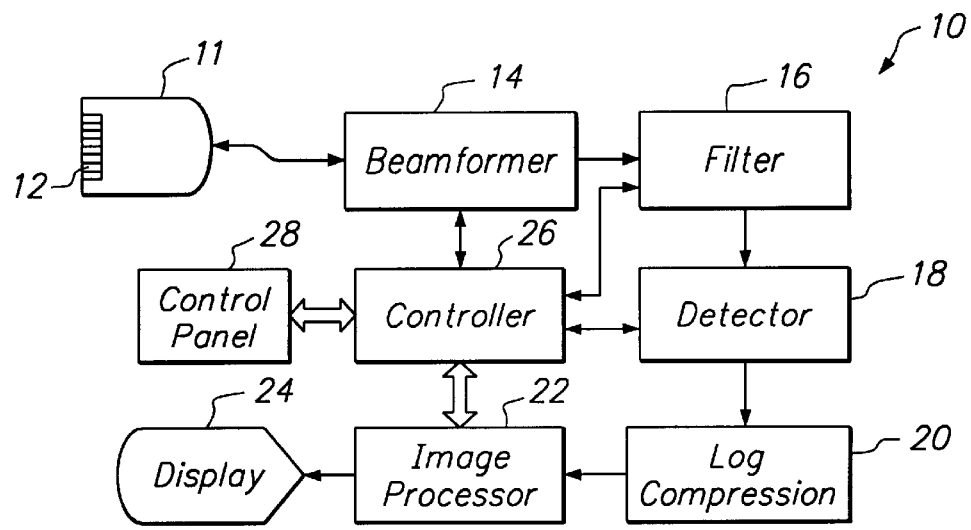
FIG. 1 is a block diagram of a previously known medical ultrasound imaging system.

Referring to FIG. 1, a block diagram of a typical previously known ultrasound imaging system is described. Ultrasound imaging system 10 includes scanhead 11, beamformer 14, filter 16, detector 18, log compression circuitry 20, image processor 22, display 24, controller 26, and control panel 28. Scanhead 11 includes an array of transducer elements 12 that transmit ultrasonic pulses into tissue being examined, and receive echoes from within the tissue.

Beamformer 14 controls the transmission of the pulses and the reception of echos. For the transmitted pulses, beamformer 14 typically controls the number of transducers used for transmitting pulses, which transducers are used for transmitting pulses, the timing (transmit delay) of the pulses from each of the transducers, the waveforms transmitted, and the amplitude of the pulses. For the reception of echoes, the beamformer typically controls how many and which transducers receive echoes, the gain applied to the echo signals, and the time delays applied to the echo signals (receive delays). The gain may adjusted according to a time gain compensation function, so that the gain applied to the received echo signals varies according to the depth of the features causing the echoes.

Received echo signals are filtered by filter 16, which may be a bandpass filter or a more complex filter, and detected by detector 18. The detected echo signals then undergo logarithmic compression in log compressor circuitry 20, and are forwarded to image processor 22. Image processor 22, which may comprise a relatively powerful general-purpose computer, e.g., a personal computer having a 486 or Pentium®-class microprocessor, that organizes the echo signals into a format for display, and may add information such as a depth scale, and the patient's identification to the image. The image is then output on display 24.

The foregoing process is coordinated by controller 26. Controller 26 provides the parameters used by beamformer 14 to transmit pulses and receive echoes, as well as parameters used by filter 16, detector 18, and image processor 22. In most ultrasound imaging systems, all of these parameters are input to controller 26 by the system operator using control panel 28. As explained above, selecting parameters that provide an acceptable image for a particular tissue type and patient may require the exercise of considerable judgment by an experienced system operator. Accordingly, in some systems, controller 26 includes a parameter memory or database containing pre-set parameter files for a variety of typical uses of the ultrasound imaging system. The operator of such a system may simply select a pre-set parameter file appropriate for the tissue-type being examined.

In some prior-art ultrasound imaging systems, image processor 22 may perform more complex functions than those described above. For example, image processor 22 may allow the user to zoom-in on a part of the image, or may provide simple image enhancement capabilities. Other systems also use image processor 22 to attempt automatic feature detection or object recognition in ultrasound images. Some systems combine the functions of controller 26 and image processor 22 into a single computer, and provide a variety of additional services, such as the ability to store and retrieve images in a variety of common image formats, and the ability to send ultrasound images across a network.

It will be understood by one skilled in the art that there are many variations on the basic medical ultrasound imaging system described with reference to FIG. 1. It is intended that the automatic image improvement apparatus and methods of the present invention be applicable to nearly any such system.

Figure 2:
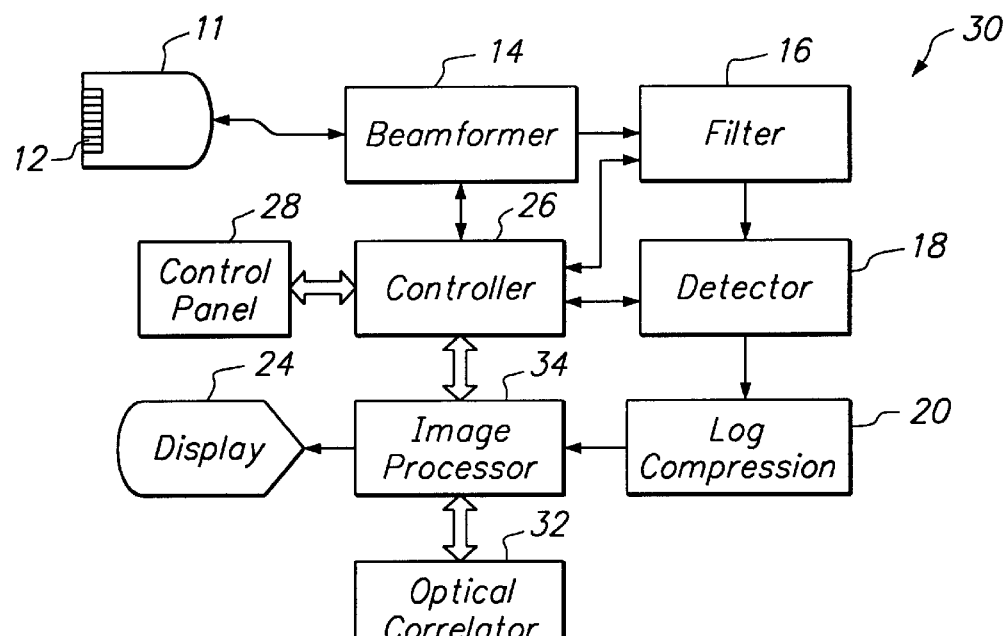
FIG. 2 is a block diagram of a medical ultrasound imaging system constructed in accordance with the principles of the present invention.

Referring now to FIG. 2, an ultrasound imaging system built in accordance with the principles of the present invention is described. Ultrasound imaging system 30 preferably includes the components of ultrasound imaging system 10 of FIG. 1, and in addition includes optical correlator 32 coupled to image processor 34. Ultrasound system 30 may comprise a newly manufactured integrated system, or may result from the addition of a retrofit circuit board, including optical correlator 32 and upgraded image processor 34, to the previously known ultrasound imaging system of FIG. 1.

Image processor 34 of FIG. 2 is programmed to provide ultrasound images to optical correlator 32, and to use the resulting correlation data to automatically adjust the parameters of beamformer 14 and filter 16 to improve the quality of the ultrasound images. Automatic adjustment of the various parameters frees the system operator from having to specify or select the appropriate parameter settings for a particular tissue type and patient.

Figure 3:
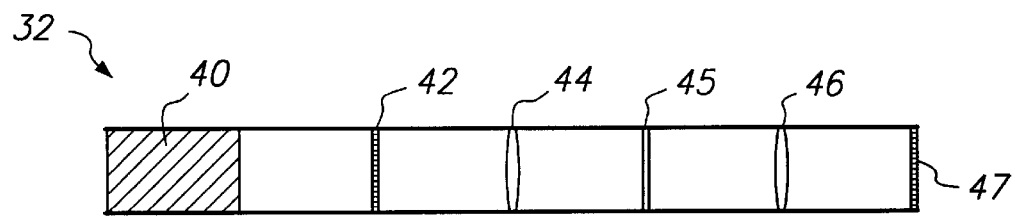
FIG. 3 is a block diagram of a previously known Vander-Lugt optical correlator.

With respect to FIG. 3, illustrative optical correlator 32, suitable for use in the present invention, is described. An optical correlator is a device that uses the inherent ability of optics to perform a Fourier transform on an entire image at once to assist in real-time pattern recognition. Optical correlator 32 is preferably of the type known as a Vander-Lugt optical correlator. A Vander-Lugt optical correlator correlates a source image with a series of digitally encoded mask images. Other types of optical correlators, such as a Joint Transform Correlator, also may be used to construct a system in accordance with the principles of the present invention.

In the illustrative embodiment of FIG. 3, optical correlator 32 comprises laser 40, producing a collimated coherent beam that is passed through input spatial light modulator (SLM) 42, where the source image is introduced. The beam, now carrying the source image, passes through lens 44, which images the Fourier transform of the source image at the Fourier plane of the lens. Mask SLM 45, located at the Fourier plane of lens 44 carries the Fourier transform of a mask image. When the beam passes through mask SLM 45, the frequency components of the source image that differ from those of the mask image are filtered out.

The resulting laser beam, which now carries the filtered frequency components of the image, passes through lens 46. Lens 46 projects the inverse Fourier transform of the image onto CCD array 47. CCD array 47 digitizes this correlation image, which contains bright areas corresponding to locations in the source image of any objects that match the mask image. The degree of brightness of pixels in the correlation image may be used to determine a degree of correspondence between the mask image and occurrences of mask images present in the source image. Once the correlation image is digitized, well-known electronic image processing techniques may be used to further process the image, and to use the correlation information for a variety of purposes.

The mask images for use in a Vander-Lugt optical correlator are stored digitally, and preprocessed to provide the Fourier transforms of the mask images. The optical correlator can correlate a source image with thousands of mask images per second. The high speed of optical correlator systems permits real-time or nearly real-time object recognition. No currently available digital image processing system is able to match this speed.

Numerous designs for a Vander-Lugt optical correlator are suitable for use in the ultrasound imaging system of the present invention. For example, SLMs 42 and 45 could be replaced with reflective SLMs, or lenses 44 and 46 could be replaced with toric mirrors. Further details on the construction of a preferred Vander-Lugt optical correlator suitable for use with the present invention can be found in U.S. Pat. No. 5,311,359, to Lucas et al., which is incorporated herein by reference. Such optical correlators are commercially available from Litton Data Systems, Inc., Agoura Hills, Calif.

Alternatively, other types of optical correlators, such as the Joint Transform Correlators, described, for example, in U.S. Pat. No. 5,650,855 to Kirsch et al., U.S. Pat. No. 5,216,541 to Taksue et al. or U.S. Pat. No. 5,438,632 to Horner, may be employed in accordance with the principles of the present invention.

In a first embodiment of the apparatus and methods of the present invention, image processor 22 sends 128×128 pixel ultrasound images, wherein each pixel has 3 bits of gray-scale information (8 levels of gray), to optical correlator 32 as a source image. Optical correlator 32 rapidly correlates the source image with mask images representing ovals of various sizes, and the correlation information is used by image processor 34 to determine properties of the speckle in the ultrasound image.

Figure 4:
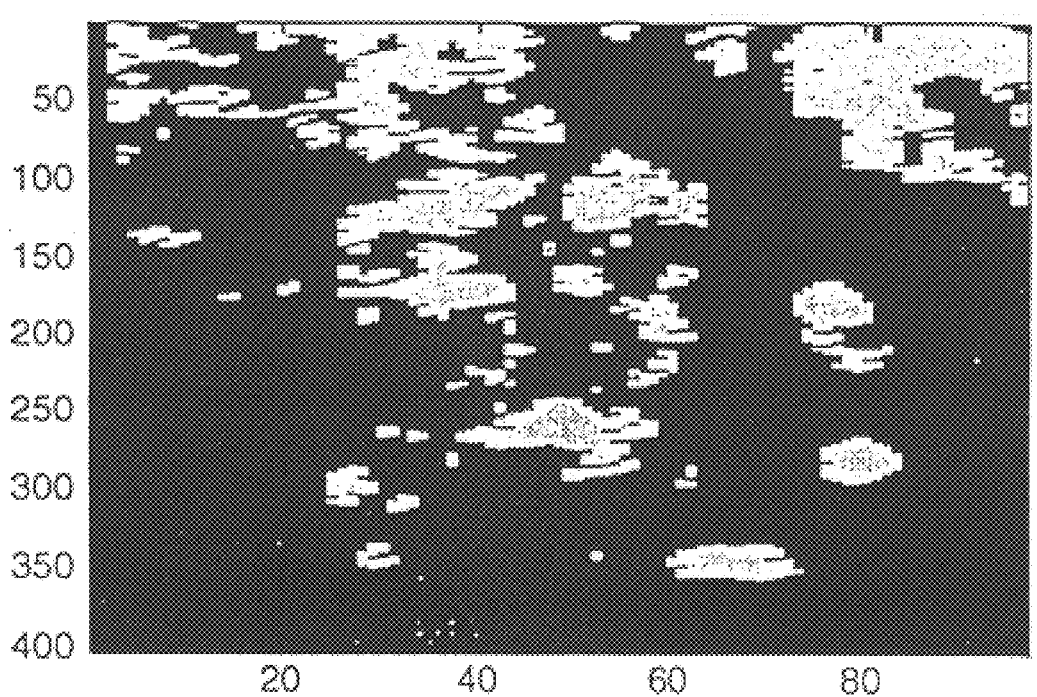
FIGS. 4 and 5 show sample ultrasound images containing well-formed, and poorly formed speckle, respectively.
Figure 5:
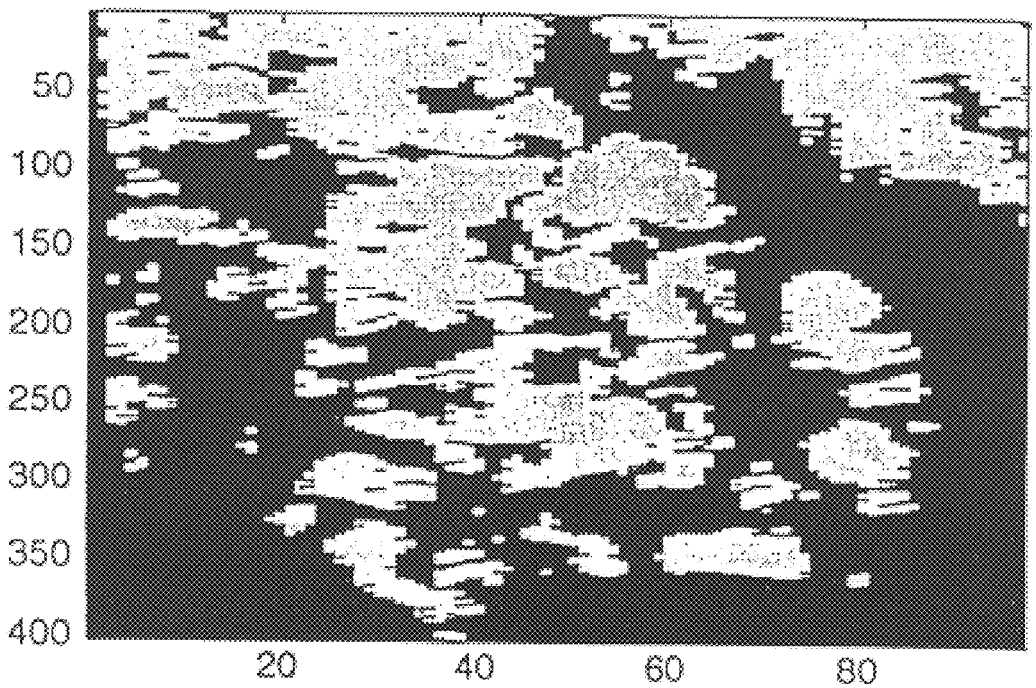

Speckle, which results from interference between the echoes from a multitude of fine scatterers present in any biological tissue, is found in all medical ultrasound images and may be used to provide an image quality metric. In a good image, such as is shown in FIG. 4, the speckle should be well-formed (i.e. roughly oval in shape), and relatively small and numerous. In a poor image, such as shown in FIG. 5, the speckle will be large, and poorly formed. When comparing the quality of two ultrasound images having the same signal strength, the "better" image will be the one with smaller, better formed speckle.

The optical correlator produces an optimization metric based on the size and shape of the speckle by correlating the ultrasound image with a series of masks representing various sized ovals. Source images that contain objects that correlate with masks of relatively small ovals will be considered better than source images that contain objects which do not correlate with the masks of ovals, or correlate with masks of large ovals. The present invention uses this property of the speckle as an optimization metric, to compare images generated using different parameter settings, to determine which parameter settings produced a better image.

Figure 6:
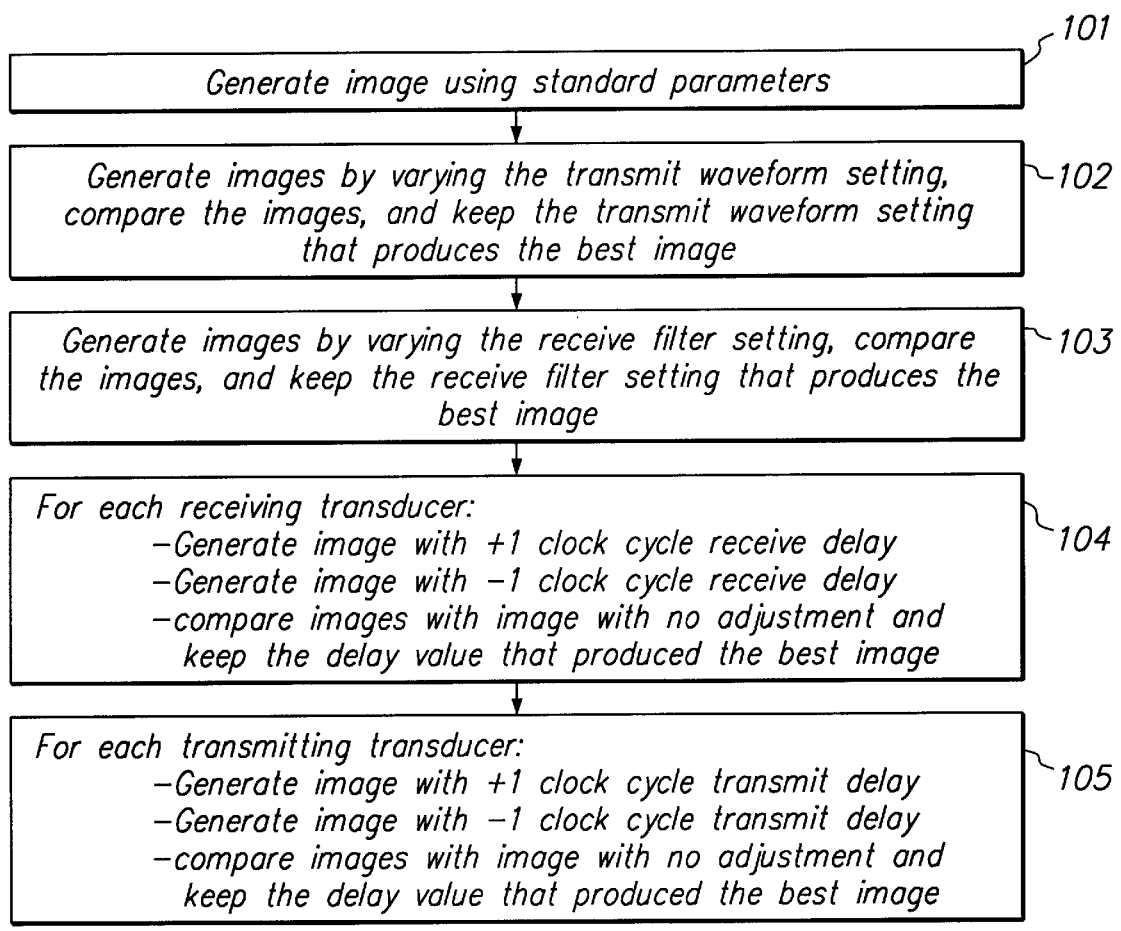
FIG. 6 is a flowchart of a method used in accordance with a first embodiment of the present invention to improve image quality by adjusting the imaging parameters of an ultrasound system.

Referring now to FIG. 6, a flow-chart of the method used by a first embodiment of the present invention to automatically select parameter settings that produce an improved image is described. At the conclusion of this calibration step, the selected parameters may be used throughout the remainder of the imaging session. Alternatively, the calibration cycle may be periodically performed throughout the imaging session, or responsive to the system operator's command, for example, if the scanhead is moved to a different region of tissue.

In step 101 of FIG. 6, the system starts by generating an ultrasound image of the tissue being examined using a generic set of parameters for beamformer 14 and filter 16. Alternatively, a parameter file containing known pre-set parameters for the tissue type being examined may be used as a starting parameter set.

Next, at step 102, the system cycles through five different known settings for the transmit waveform, generating an image for each waveform setting, and using the optical correlator to rapidly compare the quality of the images produced, as described above. The system keeps the waveform setting that produces the best image according to the optimization metric, and proceeds to adjust the filter.

In step 103, the system iterates through five known settings for the filter, each having a different center frequency, bandwidth and phase. Using the optical correlator to provide the optimization metric, the system determines which filter produced the best image, and keeps that parameter setting.

Next, in step 104, the system adjusts the receive time delays, by adjusting the receive time delay for each of the receiving transducer elements. For each receiving element, the system generates images with the receive delay adjusted by +1 clock cycle, and −1 clock cycle. Using the optical correlator to calculate the optimization metric, the original image is compared with the images using +1 and −1 clock cycle receive delays, and whichever delay value produced the best image is kept. Step 104, which performs this procedure for each receiving element, may optionally be repeated multiple times to adjust the receive delays by more than +/− one cycle.

Step 105 performs a step similar to step 104 to adjust the transmit time delays for the transmitting transducer elements. For each transmitting element, the system generates images with the transmit delay of the element adjusted by +1 clock cycle, and by −1 clock cycle. These images are compared with the original image, generated with no adjustment of the transmit delay, using the optical correlator to rapidly compute the image quality metric. The transmit delay value which produces the best image is kept. As above, this step may optionally be repeated multiple times to automatically adjust the transmit delays of the transmitting elements by more than one clock cycle.

The preferred embodiment described with reference to FIG. 6 leaves adjustment of the receive gain and amplitude of the transmitted pulses to the system operator, since these settings help determine the depth of the tissue being examined. Optionally, the system may be programmed to step through a number of options for each of these parameters. The optical correlator would be used to compare the resulting images, and the settings producing the best images would then be employed for the remainder of the imaging session.

It will be evident to one skilled in the art that the method described with respect to FIG. 6 perturbs only a relatively small number of the imaging parameters that could in fact be varied. Because complex relationships exist between the various parameter settings, adjusting one of the parameters may have an adverse effect on the optimal setting for another parameter. Searching through the entire set of possible parameter settings, however, may require an immense number of images to be compared, and could not be done in real-time, even using an optical correlator.

Accordingly, the preferred method described with reference to FIG. 6 sacrifices some image quality for speed of operation by locating the local image-quality maxima in the parameter space, rather than finding the global maximum (i.e. the parameters producing the very best possible image). Based upon applicant's experience, the parameter set selected for use in the method of FIG. 6 is expected to provide noticeable improvement in image quality for most previously known ultrasound imaging systems.

Other methods also may be employed to search for parameters that enhance image quality. For example, if enough time were available to compute the quality metric for tens (or possibly hundreds) of thousands of images, the entire parameter space may be searched by brute force to find the optimal parameters. More advanced optimization techniques, which have proven unsuccessful for adjusting ultrasound parameters in the past, may prove more successful using the apparatus and optimization metric calculation methods of the present invention.

For example, a genetic algorithms approach using the optimization metric produced by the optical correlator as a "fitness" measure for a parameter set may produce good results. The optimization metric produced by the optical correlator also may be used to attempt optimization using a simulated annealing algorithm to find the "best" parameter set. Such optimization techniques are described in *Genetic Algorithms and Simulated Annealing,* (L. Davis, ed.), Pittman (1987). It should be noted that these advanced techniques may require that the optimization metric of the present invention be refined to provide an absolute image quality value, rather than just a "better"/"worse" comparison between two images.

Ultrasound images also may be enhanced by highlighting specific features in the image that may be of interest. In an alternative embodiment of the ultrasound image improvement apparatus and methods of the present invention, the optical correlator is used to perform this task in real-time. First, an ultrasound image is produced in the usual manner. Optionally, the automatic image improvement techniques described above may used to find a set of parameters which produce a good image. The optical correlator is then used with mask images of a particular feature to identify and highlight that feature. This technique may be used, for example, to highlight micro-calcifications in breast tissue, as described with respect to FIG. 7.

Figure 7:
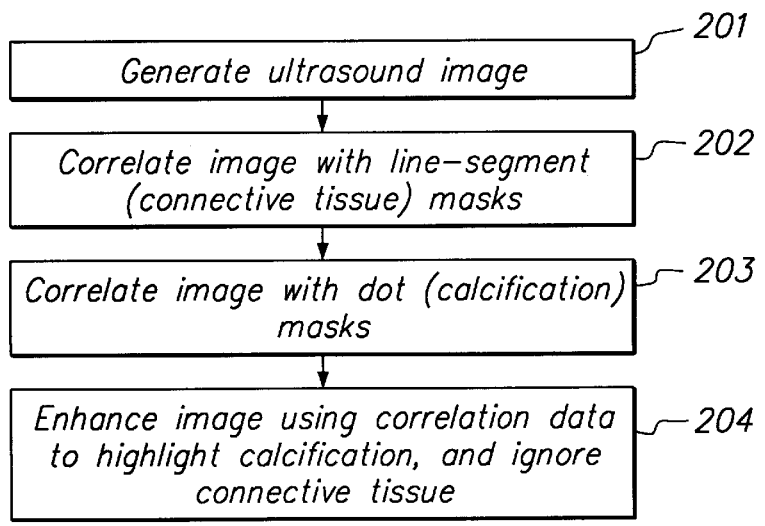
FIG. 7 is a flowchart of a method in accordance with an alternative embodiment of the present invention, in which the image is enhanced by highlighting specific features of the image.

In FIG. 7, at step 201, an ultrasound image is generated and stored digitally in image processor 34. In step 202, the image (preferably a 128×128 pixel image having 3 bits of grayscale data per pixel) is sent to optical correlator 32. In step 203, optical correlator 32 matches the image with mask images of line segments to detect connective tissue. Step 204 uses the optical correlator to detect calcifications, which appear as small dots in the image, by matching the image with mask images of small dots. Correlation data collected in steps 203 and 204 are used by image processor 34 in step 205 to enhance the image by ignoring the connective tissue (line segments), and enhancing the micro-calcifications (small dots), before outputting the enhanced image to display 24.

It will be apparent to one skilled in the art that similar methods may be used to identify and highlight or ignore other features in an ultrasound image. Use of an optical correlator to perform these operations permits many image features to be identified almost instantly.

A further alternative embodiment of the ultrasound image improvement apparatus and methods of the present invention uses an image optimization metric based on the curvature of lines in a color-encoded wavefront image to determine time delays for automatic focussing. A plurality of images are generated at a series of points along an axis, for example, by moving the ultrasound scanhead across a region to be examined. The echo data used to produce the images is stored in a buffer in the image processor. The echo data may then be used to prepare color-encoded wave-front images, such as the one shown in FIG. 8.

Figure 8:
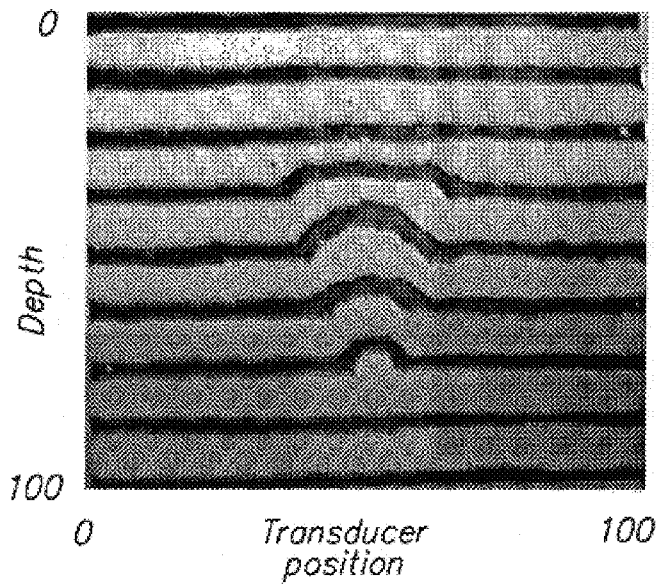
FIG. 8 shows an illustrative color-encoded wavefront image of a point target embedded in a homogeneous, acoustically scattering media.

FIG. 8 shows a 2D plot of the data generated by a single ultrasound transducer as it is translated along an axis in a region containing a single point target embedded in a homogeneous, acoustically scattering media. In FIG. 8, the data are color-encoded using a binary scheme in which all positive wave excursions appear as white pixels and all negative or zero wave excursions appear as black pixels. As will be readily recognized, a binary-encoding scheme may be readily implemented. Various types of grayscale encoding schemes may be used to implement this aspect of the invention.

The curvature of the wavefronts (i.e. the lines formed by joining adjacent pixels of like color together) is related to the time delay shifts needed to align echoes from the point target detected when the transducer is at different horizontal positions. These delays are caused by changes in the distance between the point target and the transducer, and are at a minimum when the transducer is directly over the point target.

The optical correlator is used to determine the time delays that must be applied by generating a color-encoded wavefront image as the input image, and correlating it with mask images consisting of curved lines, associated with known time shifts. Data segments in the color-encoded image are corrected by applying the time delay associated with the image mask that achieves maximum correlation with the segment. When the proper time delays have been applied, the resultant wavefronts will exhibit minimum curvature.

Once this delay correction is computed for all transducers, and is applied to all the data, the waveforms generated along the axis, for example, during the horizontal sweep of the scanhead, may be combined to provide a high resolution image of a region, and to correct for noise and distortions in the image. This "synthetic aperture beamformer" method is not limited to correcting geometric distortion in the image, but also may be used to correct for overlying tissue structures.

It will be understood that the color-encoded image shown with reference to FIG. 8 is for illustration only, and neglects noise and interference effects that would be present in real data.

Figure 9:
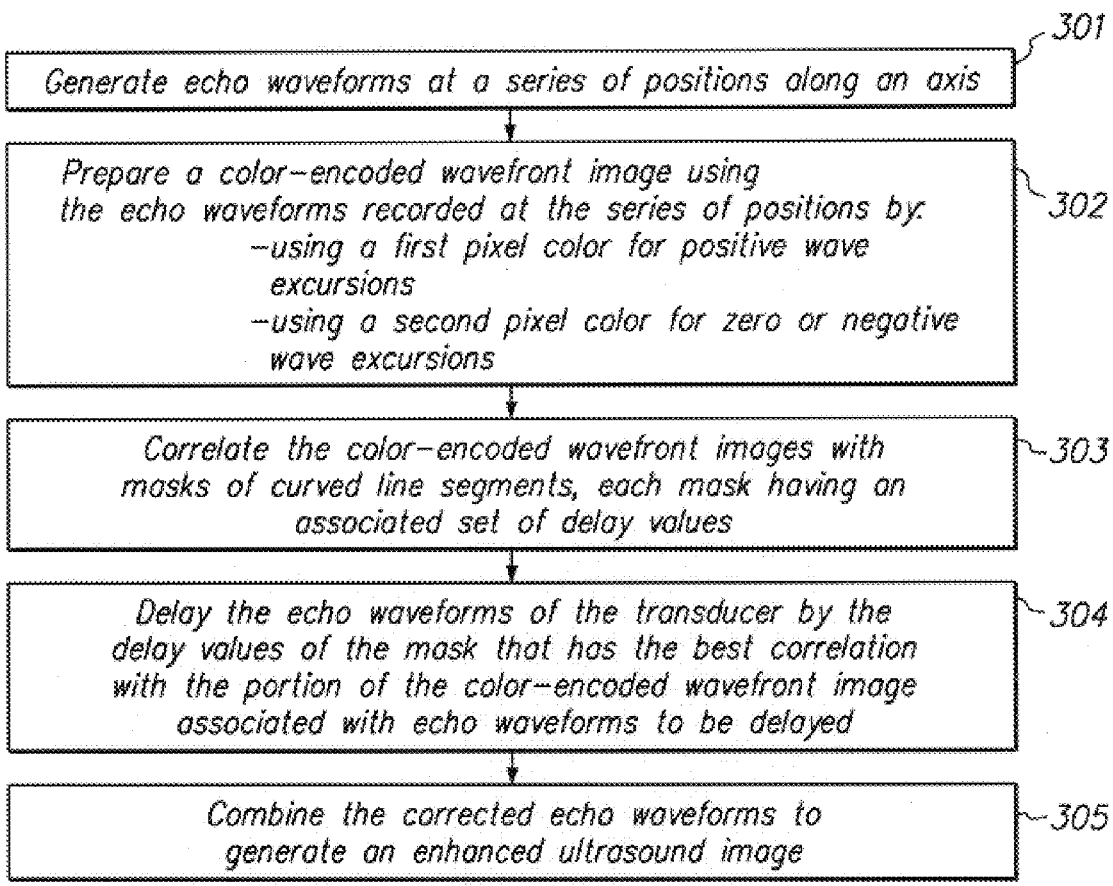
FIG. 9 is a flowchart of a method in accordance with an alternative embodiment of the present invention that uses synthetic aperture beamforming to enhance the image.

Referring now to FIG. 9, a flowchart of the above-described image improvement method is described. At step 301, scanhead 11 is swept across a region to be examined, while selected transmitting transducers send ultrasonic pulses into the tissue, and selected receiving transducers receive echo waveforms. The echo waveforms are digitally sampled and recorded in a buffer memory in image processor 34 at numerous positions across the region. Alternatively, beam focussing methods may be employed with a stationary transducer to provide images at a series of points along an axis.

In step 302, which is repeated for each of the receiving transducers, image processor 34 prepares a color-encoded wavefront image, such as the binary-encoded image of FIG. 8, by producing a plot of the time of a sample from an echo waveform (depth), against the distance along the axis (e.g., position of the transducer during the sweep). In the binary-encoding scheme described hereinabove, white pixels are used to represent positive values of a stored echo waveform (positive wave excursions), and black pixels are used to represent negative or zero values of a stored echo waveform (negative or zero wave excursions). This image preferably has a resolution of 128×128 pixels.

In step 303, which is also repeated for each of the receiving transducers, the color-encoded wavefront image is sent to optical correlator 32, where it is correlated with masks representing images of various curved lines. Each curved line mask image has delay values associated with it, and in step 304, the delay values associated with a curved line mask image are applied to the echo waveforms corresponding to areas of the color-encoded wavefront image having a high correlation with the curved line mask image. This produces corrected echo waveforms for each of the transducers that are aligned in time as the ultrasound beam sweeps along the axis.

In step 305, the corrected echo waveforms are combined (by, e.g., summing or averaging), and plotted as a regular ultrasound image (i.e. transducer number vs. time/depth), to produce an image having enhanced resolution, and decreased noise and distortion. The enhanced image is output on display 24.

The foregoing method may be used to correct distortions in the image, and to focus through aberrant tissue layers. Correlation of a color-encoded wavefront image with curved mask images also may be used to identify tissue layers that disrupt the acoustic beam. For example, because cancerous lesions in breast tissue are expected to disrupt the beam in the manner described above, the foregoing method may be useful for enhancing the detection of cancer in breast tissue.

While preferred illustrative embodiments of the present invention are described above, it will be evident to one skilled in the art that various changes and modifications may be made without departing from the invention.

For example, the construction of the optical correlator, the construction of the ultrasound imaging system, the parameters being optimized, or the resolution or type the image that is sent from the image processor to the optical correlator could easily be altered. It is intended in the appended claims to cover all such changes and modifications which fall within the true spirit and scope of the invention.

What is claimed is:

1. An ultrasound imaging system comprising:
    a scanhead, the scanhead comprising one or more transducer elements, each transducer element capable of transmitting pulses and receiving echo signals;
    beamformer circuitry coupled to the scanhead, the beamformer circuitry having a plurality of imaging parameters, the beamformer circuitry adjusting the pulses and the echo signals;
    filter circuitry coupled to the beamformer circuitry and having filter parameters, the filter circuitry adjusting the filtering of the echo signals;
    an image processor that composes an ultrasound image from the echo signals, and processes and enhances the ultrasound image prior to display; and
    an optical correlator coupled to the image processor, the optical correlator correlating a source image produced by the image processor with each one of a plurality of mask images to produce correlation data which is used in automatically adjusting the plurality of imaging parameters and filter parameters to improve the guality of the ultrasound image.

2. The ultrasound imaging system of claim 1, wherein the image processor is adapted to use the correlation data to compute an optimization metric used in enhancing the ultrasound image.

3. The ultrasound imaging system of claim 2, wherein the computed optimization metric is indicative of a quality of the source image.

4. The ultrasound imaging system of claim 3, wherein values of the plurality of imaging parameters and the filter parameters affect the quality of the source image, and wherein the optimization metric is used to compare the quality of a first source image, generated using a first set of imaging parameters and filter parameters, to the quality of a second source image, generated using a second set of imaging parameters and filter parameters.

5. The ultrasound imaging system of claim 4, wherein the optimization metric is based on size and shape characteristics of random speckle occurring in the source image.

6. The ultrasound imaging system of claim 5, wherein the optimization metric indicates that the quality of a source image having a high occurrence of small, oval shaped speckle is higher than the quality of a source image having a high occurrence of large speckle, or speckle which is not oval-shaped.

7. The ultrasound imaging system of claim 4, wherein the system is programmed to automatically adjust the imaging parameters and filter parameters, and wherein the system is adapted to use the optimization metric to select adjustments improving the quality of the source image.

8. The ultrasound imaging system of claim 7, wherein the system is adapted to repeatedly adjust the imaging parameters and filter parameters until the quality of the source image is maximized.

9. The ultrasound imaging system of claim 1, wherein the source image is the ultrasound image, the mask images are images of features to be found in the source image, and the image processor is adapted to use the correlation data to enhance the ultrasound image by highlighting the features.

10. In an ultrasound imaging system comprising a scanhead having a transducer element capable of transmitting pulses and receiving echo signals, beamformer circuitry coupled to the scanhead to adjust the pulses and the echo signals, and filter circuitry coupled to the beamformer circuitry to adjust the filtering of the echo signals, the improvement comprising:
    a circuit board comprising an image processor that composes an ultrasound image from the echo signals, and processes and enhances the ultrasound image prior to display; and
    an optical correlator coupled to the image processor, the optical correlator correlating a source image produced by the image processor with each one of a plurality of mask images to produce correlation data which is used in automatically adjusting a plurality of imaging parameters of the beamformer circuitry and a plurality of filter parameters of the filter circuitry to improve the quality of the ultrasound image.

11. The ultrasound imaging system of claim 10, wherein the image processor is adapted to use the correlation data to compute an optimization metric used in enhancing the ultrasound image.

12. The ultrasound imaging system of claim 11, wherein the computed optimization metric is indicative of a quality of the source image.

13. The ultrasound imaging system of claim 12, wherein values of the plurality of imaging parameters and values of the plurality of filter parameters affect the quality of the source image, and
    wherein the optimization metric is used to compare the quality of a first source image, generated using a first set of imaging parameters and filter parameters, to the quality of a second source image, generated using a second set of imaging parameters and filter parameters.

14. The ultrasound imaging system of claim 13, wherein the optimization metric is based on size and shape characteristics of random speckle occurring in the source image.

15. The ultrasound imaging system of claim 14, wherein the optimization metric indicates that the quality of a source image having a high occurrence of small, oval shaped speckle is higher than the quality of a source image having a high occurrence of large speckle, or speckle which is not oval-shaped.

16. The ultrasound imaging system of claim 13, wherein the system is programmed to automatically adjust the imaging parameters and filter parameters, and wherein the system is adapted to use the optimization metric to select adjustments improving the quality of the source image.

17. The ultrasound imaging system of claim 16, wherein the system is adapted to repeatedly adjust the imaging parameters and filter parameters until the quality of the source image is maximized.

18. The ultrasound imaging system of claim 10, wherein the source image is the ultrasound image, the mask images are images of features to be found in the source image, and the image processor is adapted to use the correlation data to enhance the ultrasound image by highlighting the features.

19. A method of enhancing an image produced by an ultrasound imaging system, the method comprising:
providing an optical correlator coupled to an image processor of the ultrasound imaging system;
generating a source image;
supplying the source image to the optical correlator;
using the optical correlator to correlate the source image to each one of a plurality of mask images to produce correlation data; and
using the correlation data to improve the quality of an ultrasound image.

20. The method of claim 19, further comprising using the correlation data to compute an optimization metric used in enhancing the ultrasound image.

21. The method of claim 20, wherein using the correlation data to compute an optimization metric comprises computing an optimization metric indicative of a quality of the source image.

22. The method of claim 21, wherein generating a source image comprises generating a source image containing random speckle, and wherein computing an optimization metric comprises computing an optimization metric based on size and shape characteristics of the random speckle.

23. The method of claim 22, wherein the mask images comprise images of ovals of various sizes, and using the correlation data to compute an optimization metric comprises computing a higher value of the optimization metric if the correlation data indicates that the source image contains a high occurrence of small, oval shaped speckle than if the correlation data indicates that the source image contains a high occurrence of large speckle or speckle that is not oval-shaped.

24. The method of claim 23, further comprising:
generating a first image using a first set of parameters;
generating a second image using a second set of parameters;
using the first and second images as source images for the optical correlator; and
computing the optimization metric for the first and second images to determine which of the first and second images has higher image quality.

25. The method of claim 19, wherein the mask images comprise images of features to be found in the source image, the method further comprising using the correlation data to highlight the features in the image produced by the ultrasound imaging system.

26. The method of claim 19, wherein the method further comprises:
generating a plurality of echo signals corresponding to a plurality of points along an axis;
generating a color-encoded wavefront image from the echo signals for the plurality of points;
supplying the color-encoded wavefront image as the source image to the optical correlator, and supplying images of curved line segments as the mask images, the curved line segments being associated with delay values;
using the correlation data to apply the delay values to the plurality of echo signals to produce corrected echo signals; and
combining the corrected echo signals to produce an enhanced ultrasound image.

27. The method of claim 26, wherein generating a colored-encoded wavefront image further comprises:
generating pixels having a first color corresponding to positive wave excursions in an echo signal; and
generating pixels having a second color corresponding to negative or zero wave excursions in an echo signal.

28. A method of improving image quality in an ultrasound imaging system, the ultrasound imaging system using a plurality of parameters to adjust an imaging process, the method comprising:
(a) selecting an initial parameter set, containing values for the plurality of parameters;
(b) generating a first ultrasound image using the initial parameter set;
(c) adjusting a parameter in the initial parameter set to produce an adjusted parameter set;
(d) generating a second ultrasound image using the adjusted parameter set;
(e) using an optical correlator to compute an optimization metric indicative of image quality for the first and second ultrasound images;
(f) comparing the images based on the optimization metric, to determine which of the first and second ultrasound images provides a better image;
(g) replacing the initial parameter set with the adjusted parameter set if the second ultrasound image is the better image;
(h) replacing the first ultrasound image with the second ultrasound image if the second ultrasound image is the better image;
(i) repeating (c) through (h) until the plurality of the parameters has been adjusted.

29. The method of claim 28, wherein generating a first ultrasound image comprises generating an image of tissue; generating a second ultrasound image comprises generating an image of tissue; and selecting an initial parameter set comprises reading the initial parameter set from a parameter file appropriate for the type of tissue being examined.

30. The method of claim 29, further comprising using filter circuitry, and a scanhead having a plurality of transducer elements capable of transmitting an ultrasonic pulse and receiving an echo signal, and wherein the parameters include a transmit waveform parameter, a transmit delay time for each of the transducer elements which transmit pulses, a receive time delay for each of the transducer elements which receives an echo signal, and settings for the center frequency, bandwidth and phase of the filter.

* * * * *